United States Patent Office 3,083,932
Patented Apr. 2, 1963

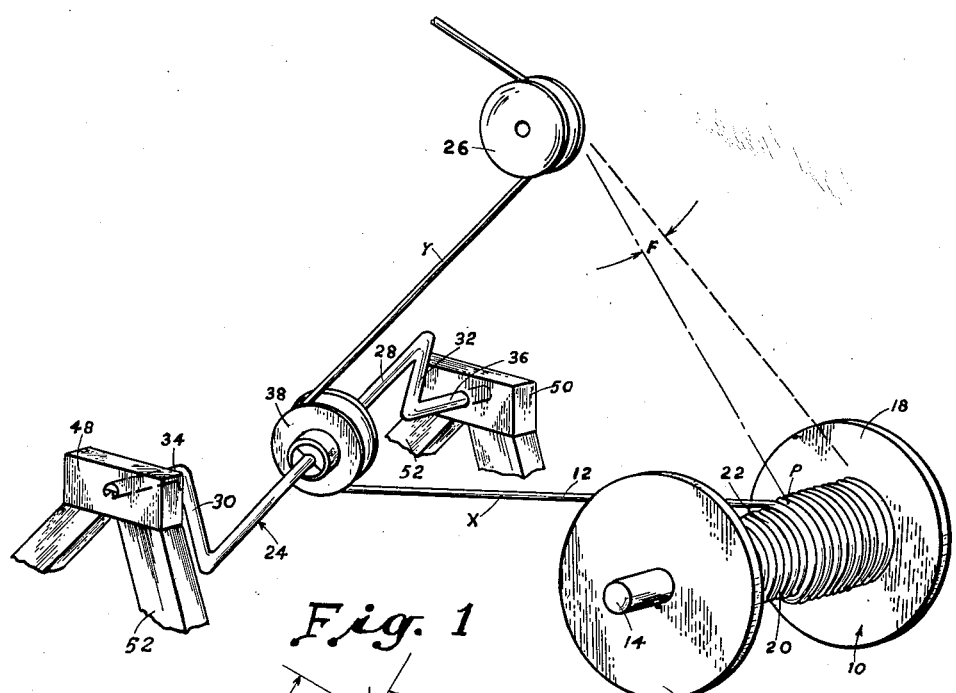
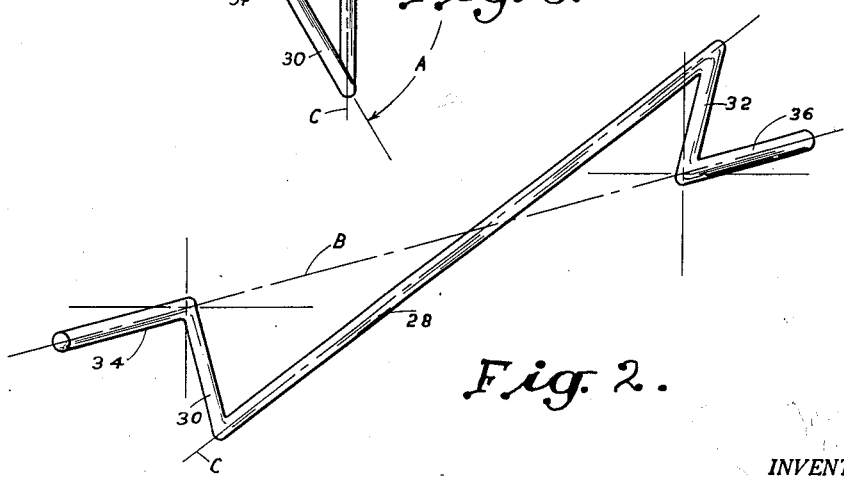

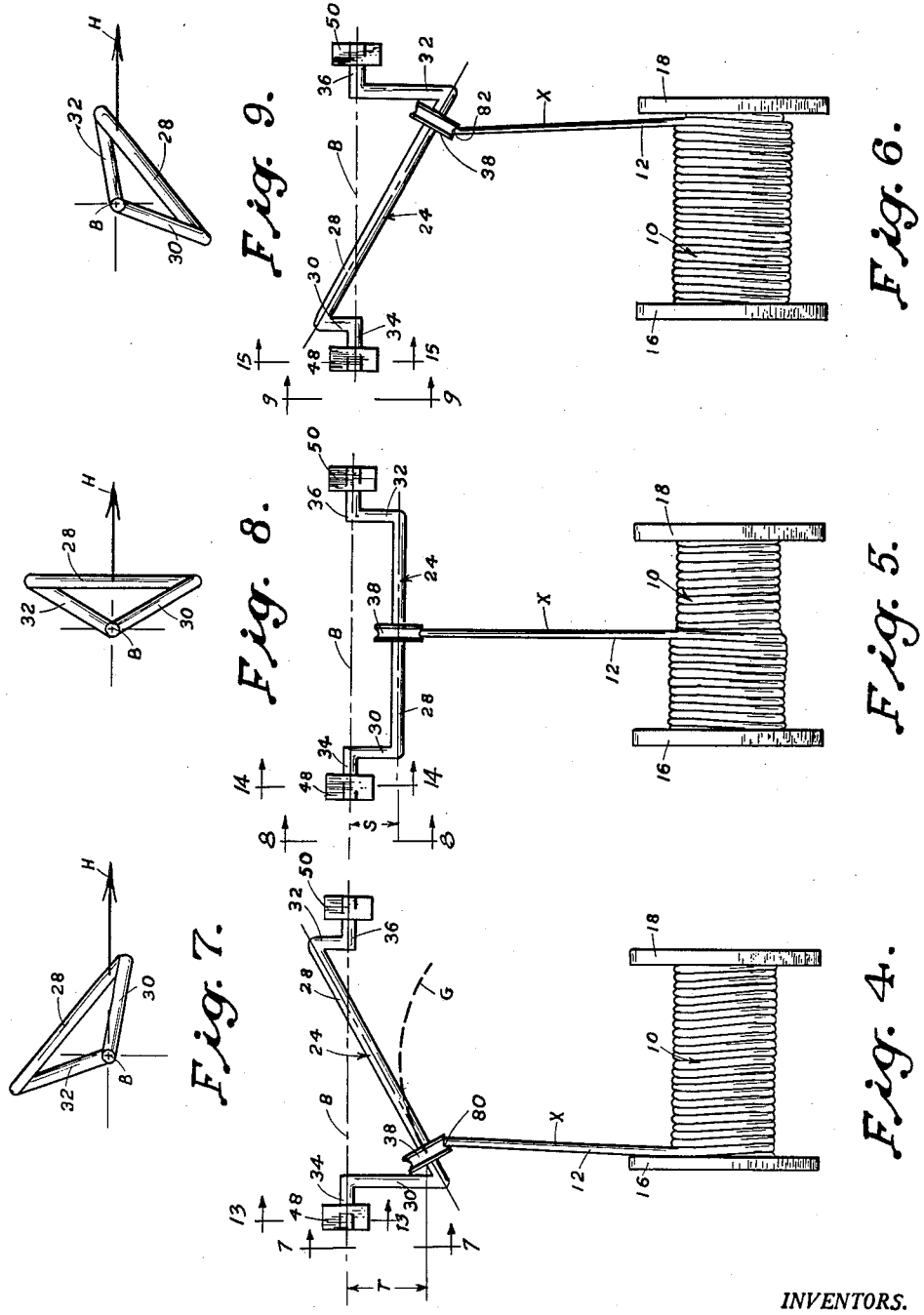

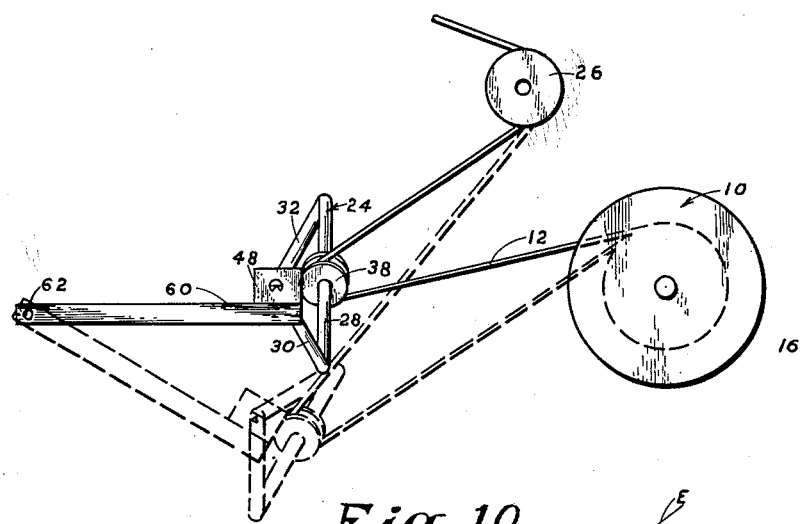

3,083,932
AUTOMATIC OSCILLATING ANGLE AND OFF-CENTER COMPENSATOR SHAFT AND FLOATING SHEAVE COMBINATION APPARATUS
Robert A. Crowley, Reynold E. Smith, and Franklin L. Le Bus, Sr., Longview, Tex., assignors to Le Bus Royalty Company, Longview, Tex., a partnership
Filed Oct. 6, 1960, Ser. No. 61,010
8 Claims. (Cl. 242—157.1)

This invention relates to improvements in cable spooling apparatus, and more particularly, but not by way of limitation, to a cable reeving automatic compensator apparatus particularly designed and constructed for compensating for and correcting the fleet angle of the cable when the fleet angle of the cable winding onto or off the drum is a detriment to the good even spooling of the cable so that it may be spooled on the drum efficiently and evenly without distortion or entangling of the cable during the winding operation.

Many problems are encountered in the winding or spooling of a wire line or cable onto a drum. Cable having a bad fleet angle from the stationary sheave to the drum core has a tendency to wind unevenly on the core of the drum, which results in a jerking and tangling of the cable as it is unspooled. This is a particular disadvantage in a hoisting or cable winding operation wherein a relatively short mast is utilized with a relatively long spooling drum. Under this type of circumstance, the fleet angle of the cable between the fixed sheave and the drum is usually extremely excessive or bad, and it is often difficult to compensate for the angle to maintain a control of the spooling operation. In addition, it is important that each layer of the cable extend across the drum core from flange to flange with each successive wrap or turn of each layer of the cable being disposed in a close relationship to the adjacent wrap without piling up or laying on top of each other in the proximity of the flange, or pile up in the middle or either side of the drum core between the flanges. It is difficult to control the winding of the cable with the successive turns close together, particularly in well bore drilling operations wherein the load on the cable frequently causes a twisting of the cable. If the initial layer of the cable is inefficiently wound on the drum, and the fleet angle is bad, the error will be increased with each successive layer until the control of the cable will be substantially lost.

The spooling of multiple layers of cable onto the drum core has also presented a problem to the hoisting industry. A counterbalance spooling system for providing a true and efficient winding of multiple layers of cable has been developed by Franklin L. Le Bus, Sr., a co-inventor of the present apparatus, and as disclosed in various Le Bus prior patents, such as United States Letters Patent No. 2,620,996, issued December 9, 1952, and entitled "Cable Winding Apparatus"; No. 2,708,080, issued May 10, 1955, and entitled "Hoisting Drum"; No. 2,732,150, issued January 24, 1956, and entitled "Balanced Cable Spooling"; and No. 2,734,695, issued Feburary 14, 1956, and entitled "Balanced Cable Spooling." The spooling system developed by the aforementioned patents has greatly advanced the cable spooling art and has met with wide acceptance in hoisting industry of all types. However, an efficient control of the cable can be maintained with the counterbalanced spooling system only if the fleet angle of the cable between the fixed sheave and the drum is contained within certain limits, preferably not greater than approximately one and one-half degrees, but not limited thereto. It has been found that a fleet angle in excess of this size, or greater than one and one-half degrees, creates further problems in the spooling operation in that the line will tend to be pulled up on a preceding wrap and start back on the next layer before the cable reaches the drum flange, or the cable will move two or three grooves toward the center of the drum as soon as it rises at the flange. In either event, there will be voids or gaps in the cable spooled on the drum, which results in an uneven winding on the core of the drum.

Many efforts have been made to improve the efficiency of cable winding operations. Frequently, an operator will stand in the vicinity of the drum as the cable having a bad fleet angle is being spooled thereon, and with the assistance of a crow bar, or the like, will attempt to manually guide the cable and correct or overcome the bad fleet angle, which is obviously inefficient and dangerous. As a result, many devices have been developed for guiding the cable or holding the line spooling onto the drum within the necessary or desirable fleet angle limits. These devices are usually either expensive geared type structures, or are manually operated, with the inherent human errors and inefficiencies. In addition, the presently available reeving structures for this purpose normally provide a considerable amount of friction which must be overcome during the operation thereof, thus greatly reducing the efficiency of operation.

The present invention contemplates a novel fleet angle compensating apparatus providing for an automatic operation in accordance with the pressure or tension of the cable to maintain a smooth and even spooling operation. The friction in the operation of the novel compensating reeving device for eliminating fleet angle of the line as it is reeved onto the drum is reduced to a minimum for optimum efficiency of control of the cable during the winding thereof onto the drum. The fleet angle compensator is particularly designed to provide a compensation for the fleet angle in both vertical and horizontal planes. The cable passes over a movable sheave particularly designed to move laterally to an angle in response to pressure of the cable whereby the cable is orientated with respect to the drum at the optimum angle therebetween for providing an efficient spooling thereof. The present invention may be utilized for controlling the spooling operation, as well as correcting the fleet angle of the cable. However, it is preferable, but not limited thereto, to utilize the novel apparatus in combination with the Le Bus counterbalanced spooling system hereinbefore set forth, thus assuring a complete and efficient spooling of the cable.

The sheave is interposed between the fixed sheave and the drum for receiving the cable therearound, and is carried by an eccentrically disposed shaft. The floating sheave is movable along the shaft in response to the pressure of the cable whereby the shaft is rocked or oscillated in an eccentric motion with respect to an axis of rotation thereof. As will hereinafter more fully appear, the axis of rotation of the shaft is non-coplanar with respect to the longitudinal axis of the shaft itself. The automatic eccentric movement of the shaft combined with the lateral movement of the sheave therealong provides an arcuate path of motion for the center line of the sheave as the cable is wound or unwound from the drum. This arcuate movement of the floating sheave maintains the length of the cable between the fixed sheave and the drum substantially constant throughout the spooling operation and compensates for the fleet angle between the fixed sheave and the drum. This action of maintaining the length of the cable constant between the fixed sheave and the drum is an important feature of the efficient compensation of the fleet angle, and results in a substantially perpendicular path for the cable with respect to the axis of the drum as the cable leaves the drum. This substantial elimination of the fleet angle results in a greatly increased efficiency of the cable spooling operation. However, it is to be noted that the reeving apparatus or fleet angle compensator apparatus is not intended to be a cable spooling device in itself. The true and efficient spooling provided by the aforementioned Le Bus counterbalanced spooling system is desirable to provide for the over-all efficient results of the fleet angle compensator apparatus. The compensator apparatus will function to correct the fleet angle with substantially any cable spooling operation, but the end results of efficiently spooled cable on a drum will be only as true as the cable spooling device utilized therewith. Thus, it is important that the fleet angle compensator apparatus be utilized with a counterbalanced spooling operation for optimum efficiency thereof in cable winding in all hoisting operations.

It is an important object of this invention to provide a novel reeving apparatus for compensating for and controlling the fleet angle during the spooling of a line onto a drum in a true and accurate manner for substantially eliminating any distortion or entanglement of the cable during the spooling operation.

It is another object of this invention to provide a novel fleet angle compensator apparatus particularly designed and constructed for maintaining a substantially constant length for the cable between the fixed sheave and the drum throughout the spooling or unspooling operation.

Another object of this invention is to provide a novel fleet angle compensator apparatus which is responsive to the pressure of the cable for automatically compensating for the fleet angle in the cable spooling operation.

A further object of this invention is to provide a fleet angle compensator apparatus for automatically providing fleet angle compensation for both vertical and horizontal movement of the cable.

Still another object of this invention is to provide a novel fleet angle compensator apparatus for automatically maintaining the cable substantially perpendicular to the axis of the drum at all times during a cable spooling operation.

A further object of this invention is to provide a fleet angle compensator apparatus which may be adjusted to compensate for any misalignment of field installations or change in the disposition of the fixed sheave with respect to the drum whereby the fleet angle will be corrected accordingly.

A still further object of this invention is to provide a fleet angle compensator apparatus for automatically correcting a bad fleet angle and which is connected to the drum only through the cable itself.

Another object of this invention is to provide a fleet angle compensator apparatus for automatically correcting a bad fleet angle which is responsive to the pressure in the cable for the operation thereof completely independent of manual or other attention.

Still another object of this invention is to provide a fleet angle compensator apparatus wherein the friction from a bad fleet angle during the operation thereof is reduced to a minimum for greatly increasing the efficiency thereof.

It is a still further object of this invention to provide a novel fleet angle compensator apparatus which is simple and efficient in operation and economical and durable in construction.

Other objects and advantages of the invention will be evident from the following detailed description, read in conjunction with the accompanying drawings, which illustrate our invention.

In the drawings:

FIGURE 1 is a perspective view of a fleet angle compensator apparatus embodying the invention and depicted in combination with a cable spooling drum and fixed sheave.

FIGURE 2 is a perspective view of the eccentric shaft of the fleet angle compensator apparatus.

FIGURE 3 is an end elevational view of the shaft.

FIGURE 4 is a plan view of a fleet angle compensator apparatus embodying the invention, and depicting one position thereof during the cable spooling operation.

FIGURE 5 is a view similar to FIG. 4 showing another position of the cable spooling operation.

FIGURE 6 is a view similar to FIG. 4 showing still another position of the cable spooling operation.

FIGURE 7 is an elevational view taken on line 7—7 of FIG. 4.

FIGURE 8 is an elevational view taken on line 8—8 of FIG. 5.

FIGURE 9 is an elevational view taken on line 9—9 of FIG. 6.

FIGURE 10 is a side elevational view of a fleet angle compensator embodying the invention depicting a modified mounting therefor and with portions in dotted lines for purposes of illustration.

FIGURE 11 is a perspective view of a modified form for the eccentric shaft member.

FIGURE 12 is a sectional view of the floating sheave member and bushing therefor.

FIGURE 13 is an enlarged sectional view taken on line 13—13 of FIG. 4.

FIGURE 14 is an enlarged sectional view taken on line 14—14 of FIG. 5.

FIGURE 15 is an enlarged sectional view taken on line 15—15 of FIG. 6.

FIGURE 16 is a free body force diagram of the forces acting on the eccentric shaft.

Referring to the drawings in detail, reference character 10 generally indicates a drum or winch having a cable 12 spooled thereon. The drum 10 may be journalled on a suitable shaft 14 for rotation, and is provided with opposed end flanges 16 and 18 as is well known. It is preferable that the drum 10 be provided with a core 20 (FIG. 1) having a plurality of cable receiving grooves 22 on the outer periphery thereof to facilitate the winding or spooling of the first layer or wrap of the cable 12 onto the drum 10, as is well known in the industry, and as set forth in the Le Bus counterbalance spooling patents heretofore described. However, it is to be noted that any suitable drum or winch may be utilized with the invention.

A fleet angle compensator apparatus, generally indicated at 24, is secured in juxtaposition to the drum 10, as will be hereinafter set forth, and is interposed between the drum 10 and a fixed position sheave 26 (FIG. 1). The cable 12 extends from the drum 10, through the reeving apparatus or fleet angle compensator apparatus 24, around the sheave 26, and thence to the load (not shown) being manipulated thereby. The sheave 26 may be journalled for rotation in any well known manner (not shown), and is normally spaced from the drum as clearly shown in FIG. 1 in such a manner that the sheave 26 is substantially centrally disposed between the drum flanges 16 and 18. However, there are many installations in which the sheave 26 is disposed to either one side or the other with respect to the drum 10, and the fleet angle compensator apparatus 24 may be adjusted to correct for any misalignment or off-set installation of the sheave 26.

The fleet angle compensator apparatus 24 comprises an off-center or eccentric compensator shaft 28 having an arm or throw member 30 and 32 provided at the opposed end thereof. The throw members 30 and 32 are preferably mutually perpendicular with respect to the shaft 28, but are off-set or angularly disposed with respect to each other, as indicated by angle A in FIG. 3. Each of the arms or throw members 30 and 32 is provided with a substantially perpendicularly extending trunnion member 34 and 36, respectively. The trunnions 34 and 36, as shown in FIG. 2, are preferably in substantial axial alignment, as indicated by the broken axis line B. The longitudinal axis C of the shaft 28 is disposed at an angle with respect to the common axis B of the trunnions 34 and 36. The axis B is the center-line of rotation for the shaft 28, and it will be apparent that the off-set and angular disposition of the axis C of the shaft 28 with respect to the axis B provides for an eccentric rotation of the shaft 28 for a purpose as will be hereinafter set forth.

The off-set and angular disposition which provides the eccentric rotation of the shaft 28, as described above, results from the fact that the longitudinal axis C of the shaft 28 and the axis B (which is the axis of rotation of the shaft) are disposed in a skew or non-coplanar relation with respect to each other, as will clearly appear from a consideration of the drawings.

The throw of the shaft 28 may be defined as the distance between the axis B of the trunnions 34 and 36 and the axis C of the shaft as measured at the end of the shaft 28. Of course, the arms 30 and 32 may not be perpendicular to the shaft 28, but it is preferable to provide a perpendicular relationship therebetween, thus the arms become the throws of the shaft. The angle A between the throws 30 and 32 (FIG. 3) may be varied in accordance with the drum and sheave installation or operating conditions, and is preferably maintained at an angle less than one hundred eighty degrees. It has been found under practical working conditions that when the angle A approaches or becomes as great as one hundred eighty degrees, the apparatus 24 may not operate automatically with the usual efficiency possible when the angle A is less than one hundred eighty degrees. In addition, the length of the throw may be varied in accordance with the operating conditions to provide the most efficient eccentric movement for the shaft 28 for compensating for and correcting the fleet angle of the cable 12, as will be hereinafter set forth.

A floating sheave or pulley 38 is journalled on the shaft 28 and is transversely movable therealong in response to the tension or pressure on the cable 12 being spooled or unspooled onto the drum 10. The sheave 38 may be journalled on the shaft 28 in any suitable manner, such as particularly indicated in FIG. 12. As shown herein, a split bearing or bushing member 40 is secured around the shaft 28 in any suitable manner and rotatable thereon, as well as movable therealong. The sheave or pulley 38 may be provided with a central hub portion 42 adapted for disposition around the bushing 40 and secured thereon by a plurality of spaced set screws or the like (not shown) extending through the bores 44. The set screws cooperate with a plurality of pockets 46 provided on the outer periphery of the bushing 40 for securing the pulley 38 thereon whereby the bushing 40 and pulley or sheave 38 will rotate and move along the shaft 28 as a unit.

The trunnions 34 and 36 are carried by suitable spaced mounting blocks 48 and 50 which in turn are supported in any well known manner, such as the brace members 52. The mounting blocks 48 and 50 may be of any suitable type, such as pillow blocks, self-aligning bearings, or the like, for permitting a free rotation of the trunnions therein. As clearly shown in FIGS. 13, 14 and 15, each of the trunnions 34 and 36 is substantially identical and is preferably provided with a flat surface, such as 54, adjacent one end thereof and extending into a bore 56 provided in the respective mounting block. An angular stop member 58 is provided in the bore 56 for contacting the flat surface 54 in order to limit the rotation of the trunnions in both the clockwise and counterclockwise rotation thereof. This precludes a rotation of the trunnions through a complete revolution of three hundred sixty degrees, thus providing for an oscillation movement of the shaft 28 in response to the movement of the sheave 38 therealong.

FIGURE 10 depicts a modified type of mounting structure for the fleet angle compensator device 24 wherein the mounting blocks 48 and 50 are sutiably secured to a pair of spaced pivotal arm members 60 (only one of which is shown in FIG. 10). The arm members 60 are pivotally secured at 62 to any well known support structure (not shown) whereby the entire apparatus 24 may oscillate freely therearound in a vertical plane. This permits the fleet angle compensator apparatus 24 to move in a downward direction, as indicated in dotted lines in FIG. 10, in response to the pressure or tension differentials in the cable 12, such as when the line slackens or tightens. In this manner, the fleet angle compensator apparatus will automatically adjust to variable vertical positions of the cable 12 winding or unwinding from the drum 10, and thus provide compensation for both horizontal and vertical fleet angles.

FIGURE 11 discloses a shaft 64 similar to the eccentric shaft 28. The shaft 64 is provided with opposed arms or throw members 66 and 68 similar to the throws 30 and 32, and each of the throws 66 and 68 is provided with outwardly extending trunnion members 70 and 72, respectively. It will be readily apparent from FIG. 11 that the trunnions 70 and 72 are not in axial alignment. In this instance, the trunnions 70 and 72 are mounted in self-aligning bushings or bearings (not shown) in lieu of the blocks 48 and 50, whereby the axis of rotation of the shaft 64 will be as indicated by the line D, regardless of the alignment or misalignment of the trunnions 70 and 72. The axis D is angularly disposed with respect to the axis E of the shaft 64, and the rotation of the shaft 64 about the axis D will provide substantially the same eccentric movement as set forth with respect to the shaft 28. Thus, the trunnions need not be in axial alignment as long as they are carried by any suitable self-aligning means, such as a self-aligning bearing.

*Operation*

The fleet angle of the cable 12 between the fixed sheave 26 and the drum 10 is indicated by the angle F in FIG. 1. In spooling operations wherein no fleet angle compensator device is utilized in cooperation with the spooling drum, the cable or line 12 will tend to seek the shortest distance from the fixed sheave 26 to the drum. In other words, the line 12 will try to pile up at a point on the drum where a line passing through the sheave 26 is perpendicular to the drum axis. It will be apparent that if the length of the cable 12 between the sheave 26 and the drum 10 is maintained substantially constant at all times during the spooling operation, there will be no shortest distance for the cable to seek. As a result, there will be no preferred position on the drum where the cable will tend to pile up. Thus, the fleet angle compensator apparatus 24 is interposed between the fixed sheave 26 and the drum 10 to maintain the length of the cable 12 therebetween substantially constant throughout the spooling operation.

The floating sheave 38 moves laterally along the shaft 28 in response to the pressure or tension in the cable 12 during the spooling or unspooling thereof from the drum 10. Any movement of the cable to the left or right of the mean or center point P (FIG. 1) of the drum 10 will cause the compensating or floating pulley 38 to move to either the left or right of the center point in accordance with the direction of the spooling, or unspooling of the line or cable. The pressure of the cable 12 and the sheave 38 rotates the shaft 28 about the axis B for changing the angular position of the shaft, as clearly shown in FIGS. 4, 5 and 6. The rotation of the shaft 28 is limited in both the clockwise and counterclockwise directions by the flat surface 54 and the stop 58. Thus, the shaft rocks or oscillates about the axis B in accordance with the direction of travel of the cable 12, and as a result, the center line of the sheave 38 moves through an arcuate path, as indicated by the dotted line G in FIG. 4.

The eccentric movement of the shaft 28 moves the sheave 38 alternately toward and away from the drum 10 whereby the segment X (FIG. 1) of the cable between the drum and the floating sheave 38 is alternately shortened and lengthened with a corresponding lengthening and shortening of the cable segment Y between the fixed sheave 26 and the floating sheave 38. This maintains the over-all length of the cable 12 between the fixed sheave 26 and the drum 10 substantially constant at all times, and as a result, the cable 12 moving from or to the drum 10 from the sheave 38 remains substantially perpendicular to the longitudinal axis of the drum, thus eliminating the fleet angle, and the inherent disadvantages thereof.

The friction contact of the cable being wound on the drum exerts a pressure through the cable which is transmitted to one side of the sheave 38, thus causing the sheave 38 to move in the direction in which the pressure is exerted. Since the sheave 38 is transversely movable on the shaft 28, the sheave will follow the pressure, and move along the shaft 28 in accordance with the winding of the cable on the drum, or unwinding thereof, as desired. Therefore, if the cable 12 moves in a left hand direction, as viewed in FIG. 4, toward the drum flange 16, the sheave 38 will move along the shaft 28 in a left hand direction due to the pressure of the cable acting against the flange portion 80 of the sheave. This movement of the sheave 38 rocks the shaft 28 in a direction for moving the throw 30 toward the drum 10, thereby shortening the cable segment X and simultaneously lengthening the cable segment Y.

Similarly, when the cable is moving in a right hand direction, or toward the drum flange 18, as shown in FIG. 6, the pressure of the cable acting against the flange portion 82 of the sheave 38 moves the sheave 38 in a right hand direction for rocking the shaft 28 in a direction for moving the throw 32 toward the drum 10. It will be apparent that the rocking motion of the shaft 28 is continual as the sheave 38 moves laterally or longitudinally therealong, thus constantly compensating for and correcting the fleet angle and maintaining the cable substantially perpendicular to the axis of the drum at all times during the spooling operation.

As shown in FIGS. 7, 8 and 9, the pull or pressure of the cable, as indicated by the arrow H, or the resultant force on the sheave 38 always passes through the center line of rotation B, and the forces on the shaft are always balanced. Referring to the free body force diagram depicted in FIG. 16, the force in arm 30 plus the force in arm 32 is equal to the force H. This is shown by the formula:

$$F_{30}+F_{32}=H$$

The summation of moments about the center line of rotation B will always be equal to zero, as shown by the formula:

$$F_{30}(X)=F_{32}(Y)$$

By revising the above, it can be found that the force in arm 30 is in the ratio to the force in arm 32 as the distance X is to the distance Y, as follows:

$$\frac{F_{30}}{F_{32}}=\frac{Y}{X}$$

Therefore, the shaft 28 may be so designed that the proper distance, T minus S (see FIGS. 4 and 5) is provided in accordance with the desired installation. Then, the shaft 28 will rotate a proportional amount and at all times will keep the sheave 38 at a position that will maintain a constant length for the cable between the fixed sheave 26 and the drum 10.

By way of summary, the fleet angle correction apparatus 24 automatically compensates for and corrects the fleet angle of the cable coming from the fixed position sheave 26 and maintains the cable in a substantially perpendicular relationship with regard to the axis of the drum 10 during the spooling or unspooling operation. The pressure of the cable passing under the floating sheave 38 automatically causes an oscillating or rocking movement of the shaft 28 simultaneously with a transverse movement of the sheave 38 therealong for maintaining a constant length for the cable between the fixed sheave and the drum. Thus, the true and even spooling of the cable onto the drum by means of a counterbalanced spooling system, such as disclosed in the prior Franklin L. Le Bus, Sr., patents, can be greatly facilitated and improved in hoisting or spooling operations wherein the fleet angle is excessive or detrimental to the efficiency of the winding operation.

From the foregoing, it will be apparent that the present invention provides a novel reeving apparatus for compensating for and correcting the fleet angle in the spooling or unspooling of a line from a winch or drum for effecting an efficient winding of the line onto the drum without any distortion or entanglement thereof. The novel reeving apparatus is automatically shifted or oscillated by the pressure of the cable or line being spooled for maintaining the line substantially perpendicular to the axis of the drum throughout the spooling operation. The eccentric shaft may be so designed and constructed to automatically provide for the optimum oscillation or rocking movement thereof in accordance with the installation of the hoisting equipment. The novel fleet angle compensator apparatus is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In combination with a drum having a cable wound thereon, a fleet angle compensator apparatus comprising a shaft, a movable sheave journalled on the shaft for receiving the cable, means carried by the shaft to provide for rotation thereof about an axis which is non-coplanar with respect to the normal axis of the shaft, said sheave slidably secured to the shaft and movable therealong in response to pressure of the cable for oscillation of the shaft about the axis of rotation for maintaining the cable substantially perpendicular with respect to the axis of the drum.

2. In combination with a drum having a cable wound thereon, a fleet angle compensator apparatus comprising a shaft, off-set trunnion means carried by the shaft to provide an axis of rotation therefor which is non-coplanar with respect to the longitudinal axis of said shaft, a sheave journalled on the shaft for receiving the cable and slidably secured thereon for movement therealong in response to the pressure of the cable for oscillating the shaft about the axis of rotation, said oscillation of said shaft cooperating with said movement of said sheave along the shaft to provide an arcuate path of movement for the center line of the sheave for maintaining the cable substantially perpendicular to the axis of the drum.

3. A fleet angle compensator for a cable drum spooling apparatus and comprising a shaft, a pair of arm members disposed at each end of the shaft, trunnion means carried by the arm members, means supporting the trunnions for rotation thereof about a common axis of rotation, said common axis of rotation being disposed in a non-coplanar relation with respect to the axis of the shaft to provide an eccentric movement of the shaft upon rotation thereof, a sheave journalled on the shaft and slidably secured thereon for movement therealong, said sheave interposed between the drum and a fixed position sheave having the cable extending therebetween, said first mentioned sheave movable along the shaft in response to pressure of the cable for rocking the shaft to provide an arcuate path of motion for the center line of the movable sheave whereby the cable is maintained substantially perpendicular to the axis of the drum.

4. In combination with a drum having a cable wound thereon, a fleet angle compensating apparatus comprising a shaft, a movable sheave journalled on the shaft for receiving the cable therearound, means to provide an off-set axis of rotation for the shaft which is non-coplanar with respect to the longitudinal axis of said shaft, said sheave slidably secured to the shaft for movement therealong in response to the pressure of the cable for oscillating the shaft in an eccentric movement whereby the center line of the sheave moves in an arcuate path for maintaining the cable substantially perpendicular to the axis of the drum.

5. In combination with a drum having a cable wound thereon, a fleet angle compensating apparatus comprising a shaft, a movable sheave journalled on the shaft for receiving the cable therearound, means carried by the shaft to provide an off-set axis of rotation therefor which is non-coplanar with respect to the longitudinal axis of said shaft, said sheave slidably secured to the shaft for movement therealong in response to the pressure of the cable for oscillating the shaft in an eccentric movement whereby the center line of the sheave moves in an arcuate path for maintaining the cable substantially perpendicular to the axis of the drum.

6. In a fleet angle compensator apparatus for cable spooling, a shaft comprising a central portion, arm members disposed at the opposed ends of the central portion and extending angularly therefrom and angularly disposed with respect to each other, trunnion means carried by the arm members to provide an axis of rotation for the shaft, said axis of rotation being disposed in a non-coplanar relation with respect to the longitudinal axis of said central portion of said shaft.

7. A fleet angle compensator apparatus for line spooling comprising a shaft, a sheave journalled on the shaft and slidably secured thereto for movement therealong, and means carried by said shaft and providing an axis of rotation for said shaft which is non-coplanar with respect to the longitudinal axis of the shaft itself.

8. In a fleet angle compensator apparatus for cable spooling, a spooling drum, a first sheave mounted for rotation at a position fixed with respect to said drum, a shaft, a second sheave journalled on said shaft, means carried by said shaft to provide for rotation thereof about an axis which is non-coplanar with respect to the longitudinal axis of said shaft, a cable passing from said first sheave and being wound on said drum, said cable engaging said second sheave at a position intermediate said first sheave and said drum, said second sheave being slidably secured to said shaft and movable therealong in response to pressure of the cable to provide an arcuate path of movement for said second sheave for maintaining a substantially constant length for the portion of said cable extending from said first sheave to said drum.

References Cited in the file of this patent

UNITED STATES PATENTS

| | | |
|---|---|---|
| 2,228,346 | Downie | Jan. 14, 1941 |
| 2,249,117 | Crandall | July 15, 1941 |
| 2,372,232 | Thornburg | Mar. 27, 1945 |
| 2,595,584 | Jones | May 6, 1952 |
| 2,855,163 | Powers | Oct. 7, 1958 |
| 2,922,599 | Bigelow | Jan. 26, 1960 |

FOREIGN PATENTS

| | | |
|---|---|---|
| 686,105 | Germany | Jan. 3, 1940 |